No. 855,818. PATENTED JUNE 4, 1907.
W. R. SMITH.
PNEUMATIC TIRE.
APPLICATION FILED JUNE 1, 1906.
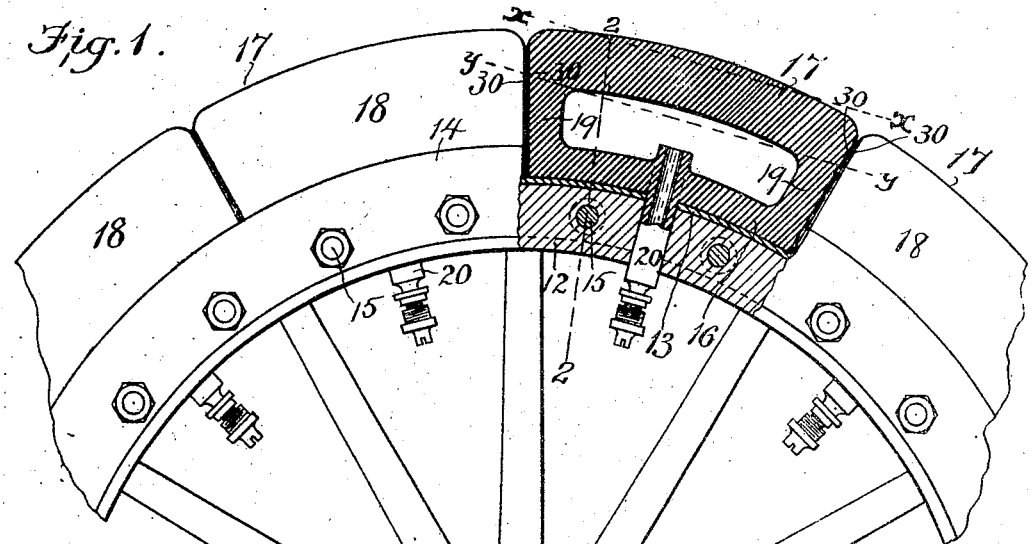
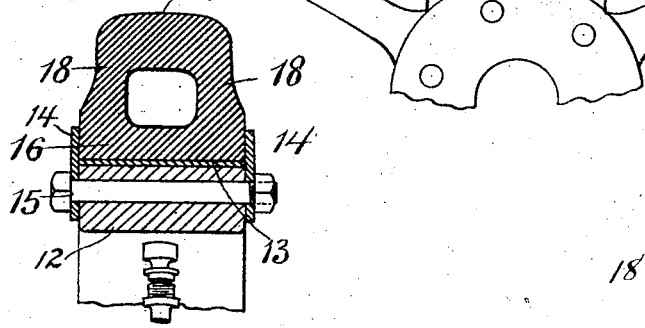
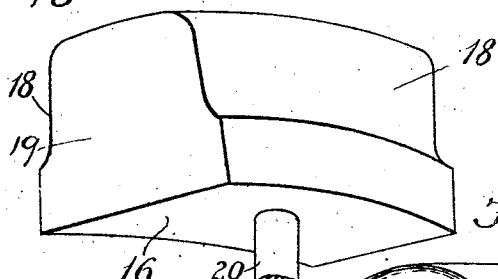
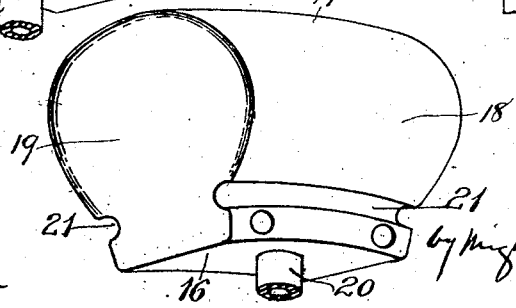
Witnesses.
C. H. Pezzetti
E. Batchelder
Inventor.
W. R. Smith
by Wright Brown Quimby May
Attys.

UNITED STATES PATENT OFFICE.

WILLIAM R. SMITH, OF BUFFALO, NEW YORK, ASSIGNOR OF ONE-HALF TO HERBERT H. HEWITT, OF BUFFALO, NEW YORK.

PNEUMATIC TIRE.

No. 855,818.         Specification of Letters Patent.         Patented June 4, 1907.

Application filed June 1, 1906. Serial No. 319,710.

*To all whom it may concern:*

Be it known that I, WILLIAM R. SMITH, of Buffalo, in the county of Erie and State of New York, have invented certain new and useful Improvements in Pneumatic Tires, of which the following is a specification.

This invention relates to wheels intended particularly for motor vehicles, and adapted to carry heavy loads, and to wheels having pneumatic tires composed of independently inflated sections, each of which confines a charge of air under pressure, and is capable of being applied and removed independently of the other sections, so that the puncturing and deflation of any one section will not affect the condition of the other sections, and constitutes a damage which can be readily repaired by replacing the deflated section without disturbing or re-inflating the other.

The invention has for its object first to provide a sectional tire of such construction that the meeting ends of the sections assembled on the wheel rim form cushions adapted to support the weight of the wheel and its load, the length of the sections being such that the cushions are relatively close together, so that chords of the arcs of the tread walls of the sections between the cushions are outside the corresponding portions of the wheel rim, the result being that in the event of deflation of any section, its tread will be prevented by the sections at its opposite ends from sinking inwardly far enough to come in contact with the rigid wheel rim, the crushing of the tread between the wheel rim and the track being thus prevented.

The invention also has for its object to provide improved means for detachably securing the tire sections to the wheel rim.

The invention consists in the improvements hereinafter described and claimed.

Of the accompanying drawings, forming a part of this specification,—Figure 1 represents a side elevation, partly in section, of a portion of a vehicle wheel embodying my invention. Fig. 2 represents a section on line 2—2 of Fig. 1. Fig. 3 represents a perspective view of one of the tire sections shown in Figs. 1 and 2. Fig. 4 represents a view similar to Fig. 2, showing a different embodiment of my invention. Fig. 5 represents a perspective view of the tire section shown in Fig. 4.

The same letters of reference indicate the same parts in all the figures.

In Figs. 1 and 2, I show a wheel rim comprising a felly 12, which may be of wood, and a metal band or tire 13 surrounding the felly. It will be understood, however, that so far as the general construction of the wheel is concerned, in respects not pointed out in the claims or this application, any suitable and convenient construction may be adopted. The wheel rim is provided with a peripheral tire seat, which, in this case, is the outer surface of the band 13, and with relatively adjustable tire-base clamping members, hereinafter described, projecting from opposite sides of said seat. In this embodiment of the invention, the clamping members are flanges 14 14 secured to the wheel rim by bolts 15 passing through orifices formed for their reception in the flanges and rim, said bolts having heads and nuts which permit the loosening and relative adjustment of the clamping members or of one of said members relatively to the other. The portions of the clamping members which project outwardly from the rim are in this case somewhat inclined, as shown in Fig. 2, so that they slightly overhang the tire seat of the wheel rim, and form a dove-tailed space for the reception of the base portion of the tire. The wheel is provided with a tire composed of independent air-chambered tire sections, made of suitable elastic material, such as rubber or a composition containing rubber. The sections are of segmental form, and are abutted together end to end to form a continuous tire surrounding the wheel rim. Each section comprises an inner or base wall-portion 16, shaped to conform to the tire seat on the wheel rim, a tread wall portion 17, side wall portions 18, 18 connecting the base and tread wall portions and end wall portions 19 19 which radiate from the wheel rim, the end wall portions of the sections abutting together when the sections are in place. The base wall portions 16 have edge faces which are shaped to conform to the inner surfaces of the clamping members 14. The base wall portions 16 are of substantial thickness, their thickness being preferably about equal to the width of the portions of the clamping members projecting from the tire seat. The normal width of the base wall portions 16 is preferably somewhat greater than the width of the tire seat, so that the adjustment of the clamping members to their clamping position will involve a compression of the base wall portion of the section. The thickness of the base wall portion is such that when it is under compression by the clamping members, it will not have a tendency to spring or buckle outwardly from the tire seat. Each tire section is provided with means whereby it may be independently inflated, the means here shown comprising an air tube 20 having an air-tight connection with the base wall 16 and extending through the latter and through the wheel rim, the said tube having a suitable valve at its outer end adapted to be connected with an air pump. The air tube and valve may be any of the well-known constructions, such as are commonly used in pneumatic tires, and especially in tires for heavy vehicles. The tire sections are adapted to be securely attached to the wheel-rim, each section being secured by the engagement of its inner or base wall with outwardly projecting clamping members or flanges on the wheel rim, so that no fastening members are required within the air chambers of the sections. The relatively thick base walls of the sections, provided with faces conforming to the tire seat on the wheel rim and to clamping members which extend along the entire length of each section, and across the joints between the sections, enable the sections to be firmly secured by the grasping and clamping pressure exerted upon their base portions by the clamping members. In the event of the deflation of any of the sections, it can be readily removed by loosening one of the clamping members, and another section can be readily substituted for the removed section.

In the construction shown in Figs. 4 and 5, the base wall portion 16 is provided in its edges with grooves 21, adapted to receive tongues or ribs 22, formed on outwardly projecting clamping members or flanges 23 24. The clamping member 23 is formed on the band 25. One edge of this band is provided with a tongue or rib 26, which engages a hook 27, formed on the inner edge of the clamping member 24. The clamping member 23 may extend continuously around the wheel rim, but the clamping member 24 should be made in separable sections or segments, and are secured by bolts 28 passing through orifices formed for their reception in the clamping members 23 and 24, and in the base wall portions of the tire sections. To prevent injurious wear and chafing of the abutting ends of the tire sections, the said ends may be provided with reinforcing pieces 30, which may be composed of canvas or any other suitable wear-resisting material. The end walls 19 are of such thickness that the two abutting end walls of adjacent sections constitute, collectively, a radial cushion which is adapted to support the weight of the wheel and its load. The length of each section, and therefore the distance between the said cushions, is such that the chords of the arcs of the segmental surfaces of the tread section are outside the corresponding portion of the rigid rim of the wheel, as indicated by dotted lines in Fig. 1, the line $x\,x$ indicating the chord of the arc of the outer surface of the tread wall, while the line $y\,y$ indicates the chord of the arc of the inner surface of the tread wall. It will be seen, therefore, that in the event of deflation of any section, its tread wall will sink inwardly approximately as indicated by the lines $x\,x$ and $y\,y$, inward sinking beyond the extent indicated being prevented by the cushions formed by the end walls of the sections and the abutting end walls of the two adjacent sections. These cushions support the entire weight of the wheel and its load, with the tread wall of the deflated section entirely free from contact with any rigid part of the wheel, so that there is no possibility of any part of the deflated section being "bitten" between the rigid wheel rim and the track.

I claim:

1. A resilient pneumatic tire composed of a plurality of segmental air-chambered sections having tread, side, end, and inner or base wall portions, the latter having inner faces conforming to the tire-seat of a wheel-rim, combined with a rigid wheel rim having a seat for said inner faces, and outwardly projecting clamping members or flanges at opposite sides of said seat engaged with the base wall portions of the sections, the end walls of each section and the end walls of the adjacent sections, forming cushions adapted to support the weight of the wheel and its load, the distances between said cushions being such that chords of the arcs of the tread walls between the cushions are outside the corresponding portions of the clamping members, so that in the event of the deflation of any section, its tread will be prevented by the cushions at the opposite ends of the deflated section from coming in contact with the clamping members.

2. An air-chambered tire section having resilient tread, side, end, and inner or base wall portions, the latter having inner faces conforming to the tire face of a wheel rim, and edge faces formed to engage clamping members on the wheel rim, the thickness of the said base wall portion being such as to prevent lateral deflection or buckling of the said portion by movement of its edge faces toward each other, the said end wall portions having wear-resisting facings whereby injurious wear between the end wall portions of abutting sections is prevented.

3. A pneumatic tire composed of a plurality of segmental sections having grooves in their opposite sides adjacent to their bases, combined with a wheel rim having a continuous metallic ring or tire forming a seat for the inner faces of the sections, and provided at one edge with a fixed ribbed flange, and at the opposite edge with an inwardly-projecting rib, a detachable ribbed flange having a hooked inner edge formed to engage said rib, and bolts passing through said flanges and the intermediate portion of the tire, said bolts having heads bearing on one of the flanges, and nuts bearing on the other flange, whereby the detachable flange may be adjusted toward or from the fixed flange to clamp or release the sections.

4. An air-chambered tire section, having tread, side, end, and inner or base wall portions, the latter having a segmental inner face adapted to conform to the tire seat of a wheel rim, the end wall portions being adapted to co-operate with the end wall portions of the adjacent sections to form cushions when the sections are assembled, the distance between the end walls being such that a chord of the arc of the tread wall between the end walls is so far outside the base wall as to prevent contact between the tread portion and rigid parts of the wheel to which the section is adapted to be applied, in the event of deflation of the section.

In testimony whereof I have affixed my signature, in presence of two witnesses.

WILLIAM R. SMITH.

Witnesses:
   JOS. H. BLACKWOOD,
   A. W. HARRISON.